United States Patent
Yang et al.

(10) Patent No.: US 12,252,346 B2
(45) Date of Patent: Mar. 18, 2025

(54) CIRCULATING CONVEYOR

(71) Applicant: CONTEMPORARY AMPEREX TECHNOLOGY (HONG KONG) LIMITED, Hong Kong (CN)

(72) Inventors: Kun Yang, Fujian (CN); Tengteng Wang, Fujian (CN); Xiang Fan, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 102 days.

(21) Appl. No.: 18/129,904

(22) Filed: Apr. 3, 2023

(65) Prior Publication Data
US 2024/0076131 A1    Mar. 7, 2024

(30) Foreign Application Priority Data

Sep. 7, 2022 (CN) .......................... 202222370217.4

(51) Int. Cl.
*B65G 19/02* (2006.01)
*B65G 19/18* (2006.01)

(52) U.S. Cl.
CPC ........... *B65G 19/02* (2013.01); *B65G 19/185* (2013.01); *B65G 2201/02* (2013.01)

(58) Field of Classification Search
None
See application file for complete search history.

(56) References Cited

U.S. PATENT DOCUMENTS

| | | | |
|---|---|---|---|
| 10,196,164 B2 * | 2/2019 | Nakamoto | B65G 47/842 |
| 11,358,793 B2 * | 6/2022 | Garcia | B65G 35/06 |
| 2008/0289931 A1 | 11/2008 | Veile et al. | |
| 2017/0081128 A1 | 3/2017 | Okazaki et al. | |
| 2018/0044117 A1 | 2/2018 | Suzuki | |
| 2018/0162576 A1 | 6/2018 | Nakamoto | |
| 2019/0375591 A1 | 12/2019 | Douglas et al. | |

FOREIGN PATENT DOCUMENTS

| | | |
|---|---|---|
| CN | 207497545 U | 6/2018 |
| CN | 213474621 U | 6/2021 |
| CN | 114655678 A | 6/2022 |
| CN | 218200564 U | 1/2023 |
| WO | 2017/049564 A1 | 3/2017 |

OTHER PUBLICATIONS

Extended European Search Report issued Jan. 2, 2024 in European Patent Application No. 23167508.3.
International Search Report and Written Opinion mailed on Sep. 26, 2023, in corresponding PCT/CN2023/102419, 15 pages.

* cited by examiner

*Primary Examiner* — Kavel Singh
(74) *Attorney, Agent, or Firm* — XSENSUS LLP (57) ABSTRACT

A circulating conveyor may comprise: a first conveying line and a second conveying line, wherein both the first conveying line and the second conveying line have a loading position and an unloading position at the two ends and clamps may be circularly conveyed between the first conveying line and the second conveying line in a clockwise or counterclockwise direction; and a circulating adapter. The circulating adapter may comprise a first circulating adapter and a second circulating adapter arranged in pairs at both the loading position and the unloading position, wherein the first circulating adapter and the second circulating adapter may be used for conveying the clamps between the first conveying line and the second conveying line.

18 Claims, 3 Drawing Sheets

CIRCULATING CONVEYOR

CROSS-REFERENCE TO RELATED APPLICATION

The present application claims priority to Chinese Patent Application No. 202222370217.4, filed Sep. 7, 2022, which is incorporated herein by reference in its entirety.

TECHNICAL FIELD

The present application relates to the technical field of battery manufacturing, and in particular, to a circulating conveyor.

BACKGROUND ART

With energy saving and emission reduction being the key to the sustainable development of automobile industry, electric vehicles have become an important part of the sustainable development of automotive industry due to their advantages of energy saving and environmental protection. For electric vehicles, battery technology is an important factor related to their development.

In the development of battery technology, in addition to improving battery performance, production efficiency is also a problem that cannot be ignored. How to improve the production efficiency of batteries is still a technical problem that needs to be solved urgently in battery technology.

SUMMARY OF THE DISCLOSURE

In view of the above problems, the present application provides a circulating conveyor, aiming at improving battery production efficiency.

In a first aspect, the present application provides a circulating conveyor, comprising: a first conveying line and a second conveying line, wherein both the first conveying line and the second conveying line have a loading position and an unloading position at the two ends, clamps are circularly conveyed between the first conveying line and the second conveying line in a clockwise or counterclockwise direction; and a circulating adapter, comprising a first circulating adapter and a second circulating adapter arranged in pairs at both the loading position and the unloading position, wherein the first circulating adapter and the second circulating adapter are used for conveying the clamps between the first conveying line and the second conveying line.

Some embodiments of the present application do not limit the relative positional relationship between the first conveying line and the second conveying line, as long as the output direction of the first conveying line corresponds to the input direction of the second conveying line. Exemplarily, along the moving direction of each conveying line, the initial moving position of each conveying line may be the loading position, and the final moving position of each conveying line may be the unloading position. Exemplarily, the present application comprises two circulating adapter mechanisms, that is, a first circulating adapter mechanism and a second circulating adapter mechanism. Under the joint action of the two circulating adapter mechanisms, it can realize the lifting and lowering of clamps without interfering with each other, synchronously and efficiently conveying clamps in the up and down circulating lines, which improves the production efficiency of the production line.

In some embodiments, the first circulating adapter comprises a first connecting element or structure and a first driving assembly for driving the first connecting element to move up and down circularly in the vertical direction; the second circulating adapter comprises a second connecting element or structure and a second driving assembly for driving the second connecting element to move up and down circularly in the vertical direction; the first conveying line comprises a first edge position, and the first connecting element is horizontally aligned with the first conveying line at the first edge position, so that the clamp on the first conveying line is driven by power to move to the first connecting element; the second conveying line comprises a second edge position, and the second connecting element is horizontally aligned with the second conveying line at the second edge position, so that the clamp on the second conveying line is driven by power to move to the second connecting element.

Exemplarily, the first edge position on the first conveying line in the present application is generally the edge position on the side where the loading position or the unloading position is located in the clamp conveying path, and correspondingly, the second edge position on the second conveying line in the present application is generally also the edge position on the side where the loading position or the unloading position is located in the clamp conveying path. Exemplarily, at the unloading position, the side of the first connecting element used to receive the clamp is horizontally aligned with the first edge position, and driven by power, the clamp on the first conveying line can continue to move forward along the conveying direction of the first conveying line and then move to the first connecting element; since the first circulating adapter mechanism can move up and down circularly in the vertical direction under the action of the first driving assembly, when the first driving assembly drives the first connecting element with the clamp to move to the loading position of the second conveying line, the first connecting element is driven by power to drive the clamp on it and put the clamp on the second conveying line; and as the second driving assembly drives the second conveying line for conveying, the clamp on the first connecting element moves together to the second conveying line, and then is conveyed on the second conveying line. As above, the second connecting element is used in the same process as the first connecting element, which will not be described in detail here. That is, the power-driven process between the first circulating adapter mechanism and the second circulating adapter mechanism can be as above, or, according to the production requirements, the conveying time gas between the two can also be set through the driving assemblies. This aims to realize high-speed and stable linear motion on the circulating lines.

In some embodiments, both the first conveying line and the second conveying line are provided with a plurality of clamps sequentially and detachably connected along a first direction; wherein the first direction is the length direction of the conveying lines. Exemplarily, the first conveying line of the present application is provided with a plurality of clamps sequentially and detachably connected along its length direction, and adjacent clamps are detachably connected with each other, so that the clamps can realize quick disengagement and quick connection at the loading position and unloading position along the conveying direction of the conveying lines, and the space on the conveying lines can be fully utilized. Exemplarily, the present application does not limit the outer contour structure and size of the clamp, as long as it can adapt to the size of the conveying lines. Exemplarily, the detachable connection between the clamps may be a plug-in or snap-fit connection. The present application does not limit the specific structure of the plug-in or snap-fit, as long as the plug-in or snap-fit connection of two adjacent clamps along the length direction of the conveying line can be realized.

In some embodiments, the clamp is provided with a snap-fit portion or structure and a fixing portion or structure at the two ends in the first direction respectively, and the snap-fit portion of an adjacent clamp can engage with the fixing portion. The clamps of the present application are provided with snap-fit portions and fixing portions matched with each other on the two sides along the length direction of the conveying lines. The present application does not limit the structure and size of the snap-fit portion and the fixing portion, as long as the snap-fit portion and the fixing portion can be matched with each other to realize engagement and disengagement at the loading position and the unloading position.

In some embodiments, the snap-fit portion is configured as a rolling structure, and the fixing portion is configured as a groove structure, the groove structure comprises a first side and a second side opposite to the first side in the first direction, and the rolling structure engages with the groove structure between the first side and the second side. Exemplarily, in the present application, the snap-fit portion is configured as a rolling structure, the fixing portion is configured as a groove structure, and the rolling structure can realize engagement in the space between the first side and the second side of the groove structure. Because the rolling structure has the characteristics of rolling or sliding in the groove, that is, with the movement of the conveying lines, the rolling structure of the clamp that is driven to the loading position or the unloading position can disengage from the groove structure to further realize the reception of the clamp by the first connecting element or the second connecting element. By applying the groove structure and the rolling structure together, power is transmitted between the groove structure and the rolling structure, and at the same time the clamps can be positioned with each other, which eliminates the cumbersome structure of repeated positioning of each clamp on the circulating line. Thus, the structure is simpler and more efficient to run.

In some embodiments, the first driving assembly comprises a first cylinder and a first movable block fixedly connected to a piston rod of the first cylinder, the first movable block is fixedly connected to the first connecting element, and the first cylinder drives the first connecting element to move circularly in the vertical direction through the first movable block; the second driving assembly comprises a second cylinder and a second movable block fixedly connected to a piston rod of the second cylinder, the second movable block is fixedly connected to the second connecting element, and the second cylinder drives the second connecting element to move circularly in the vertical direction through the second movable block. Exemplarily, the first cylinder in the present application may be a first telescopic cylinder, the first telescopic cylinder comprises a first piston rod, the first piston rod is fixedly connected to a first movable block, and the first piston rod reciprocates in the vertical direction, during which the first piston rod can drive the first movable block and the first connecting element fixedly connected to the first movable block to reciprocate in the vertical direction. The present application does not limit the connection structure and size between any two, as long as it can ensure that the first connecting element is always in a horizontal state to receive the clamp. The present application does not limit the structure, shape and size of the first movable block, and the present application does not limit the stroke of the first cylinder, as long as it enables connection at the edge position of the first conveying line and the second conveying line and sets the time when the clamp is conveyed to the first connecting element or the second connecting element. In the present application, the first connecting element can be a single plate structure, or it can be a multi-structural assembly, which is set according to actual needs. When the first connecting element is a multi-structural assembly, the structures are connected with each other to form a stable supporting structure for supporting the clamp. Exemplarily, the present application does not limit the specific structure of the first connecting element. In the present application, the second connecting element can be a single plate structure, or it can be a multi-structural assembly, which is set according to actual needs. When the second connecting element is a multi-structural assembly, the structures are connected with each other to form a stable supporting structure for supporting the clamp. Exemplarily, the present application does not limit the specific structure of the second connecting element.

In some embodiments, the first driving assembly comprises a first horizontal driving module or driver, the first horizontal driving module comprises a first servo motor and a third movable block sliding on the guide rail of the first servo motor along a second direction, and the first cylinder is fixedly connected to the third movable block; the second driving assembly comprises a second horizontal driving module or driver, the second horizontal driving module comprises a second servo motor and a fourth movable block sliding on the guide rail of the second servo motor along the second direction, and the second cylinder is fixedly connected to the fourth movable block; wherein, the second direction is the width direction of the conveying lines. Exemplarily, both the first horizontal driving module and the second horizontal driving module may be telescopic cylinders or servo driving motors. The two can drive the first cylinder and the second cylinder through the third movable block and the fourth movable block respectively to adjust the position in the horizontal direction. Specifically, the two can respectively drive the position of the first connecting element and the second connecting element in the width direction of the conveying lines, so that it is convenient to adjust the first connecting element and the second connecting element to enable them to connect to the edge of the first conveying line and the edge of the second conveying line. All the above effects are further realized, and the operation accuracy of the equipment is further improved.

In some embodiments, the circulating conveyor further comprises a third horizontal driving module or driver, wherein the third horizontal driving module comprises a positioning assembly and a third driving assembly for driving the positioning assembly to move in the first direction; the side of the clamp is provided with an accommodating portion or structure, the positioning assembly can be locked and matched with the accommodating portion, and the clamp is conveyed along with the positioning assembly in the first direction. Exemplarily, the third driving assembly may be a servo driving motor, and the present application does not limit the way of connection between the positioning assembly and the third driving assembly, as long as the third driving assembly can drive the positioning assembly to move along the length direction of the conveying lines. The present application does not specifically limit the structure of the positioning assembly, as long as the positioning assembly and the accommodating portion can be matched and locked together, and the movement of the positioning assembly can drive the movement of the accommodating portion and the clamp with the accommodating portion. As mentioned above, the present application has limited the moving direction of the overall clamps, which will not be described in detail here. Through the servo driving motor, the driving force of the lateral movement of the clamp is realized. Using the servo driving motor, precise movement points and real-time reflection of torque change are achieved.

In some embodiments, the positioning assembly comprises a positioning pin and a positioning cylinder for driving the positioning pin to move along the first direction, and the positioning pin is matched with the accommodating portion for positioning. All the above-mentioned effects can be realized, and details are not described in detail here.

In some embodiments, the third driving assembly comprises a third servo motor and a fifth movable block sliding along the length direction of the third servo motor, and the positioning cylinder is fixed on the fifth movable block. Exemplarily, the third servo motor may also be the third cylinder. Exemplarily, the third cylinder may be a telescopic cylinder comprising a piston rod, and the piston rod of the third cylinder moves along the width direction of the conveying lines. As above, the positioning cylinder is fixed on the fifth movable block and can move along with the fifth movable block.

In some embodiments, the clamp comprises a clamp and a clamp fixed plate for supporting the clamp, the clamp fixed plate is located below the clamp, and the accommodating portion, the fixing portion and the snap-in portion are all disposed on the clamp fixed plate. Exemplarily, the conveying line of the present application may also comprise a clamp fixed plate on which the clamps are placed, the conveying line comprises a fixing block and a sliding rail for moving along the length direction of the fixing block, and the clamp fixed plate is fixed on the sliding rail. The aforementioned limitations on the features of the rolling structure, the groove structure and the accommodating portion on the clamp can also be applied to the clamp fixed plate. This facilitates grasping the first clamps.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

By reading the detailed description of the preferred implementations below, various other advantages and benefits will become apparent to those of ordinary skill in the art. The drawings are for the purpose of illustrating the preferred embodiments only and are not to be considered a limitation to the present application. Moreover, in all of the drawings, the same parts are indicated by the same reference numerals. In the drawings.

Reference numerals in the Detailed Description are as follows:
- 001. circulating conveyor;
- 10. first conveying line; 20. second conveying line; 30. unloading position; 40. loading position; 50. circulating adapter mechanism; 60. clamp; 70. clamp fixed plate; 80. snap-fit portion; 90. fixing portion; 100. positioning assembly; 110. third driving assembly;
- 51. first circulating adapter mechanism; 511. first cylinder; 512. first movable block; 513. first connecting element; 514. first servo motor; 515. third movable block;
- 61. accommodating portion;
- 52. second circulating adapter mechanism; 521. second cylinder; 522. second movable block; 523. second connecting element; 524. second servo motor; 525. fourth movable block;
- 101. positioning pin; 102. positioning cylinder;
- 111. third servo motor; 112. fifth movable block.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "comprise" and "have" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "a plurality of groups" refers to two or more (including two) groups, and "a plurality of sheets" refers to two or more (including two) sheets.

In the description of the embodiments of the present application, the orientation or position relationship indicated by the technical terms "center", "longitudinal", "transverse", "length", "width", "thickness", "upper," "lower," "front," "back," "left," "right," "vertical," "horizontal," "top," "bottom," "inner," "outer," "clockwise," "counterclockwise," "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

With the development of the new energy field, the demand for batteries is increasing day by day, and the production efficiency of battery production lines has also been widely concerned. Among them, conveying lines for placing battery-related structures are widely used in the production line. According to existing production requirements, clamps need to be loaded and unloaded between two production lines. The existing loading and unloading efficiency is low and cannot meet the demand of high production frequency. In view of this, the present application provides a circulating conveyor to improve the production efficiency of the production line.

In the present application, a circulating adapter mechanism is added between two conveying lines related to each other. Under the action of the circulating adapter mechanism, clamps can move up and down without interfering with each other, thereby realizing synchronous and efficient conveying to improve the production efficiency of the production line.

It should be noted that the production line of the present application can be applied to any node of the automatic production line, and the clamps conveyed on it can also be replaced by the corresponding products themselves. Alternatively, the clamp conveyed on it can also be a combined structure. The two circulating adapter mechanisms in the present application can also be understood as a single circulating adapter mechanism achieving the effect of alternate connection. The specific solutions and effects of the present application are described as follows taking a solution in which two circulating adapter mechanisms work together to achieve the above effect as an example.

Figure 1:
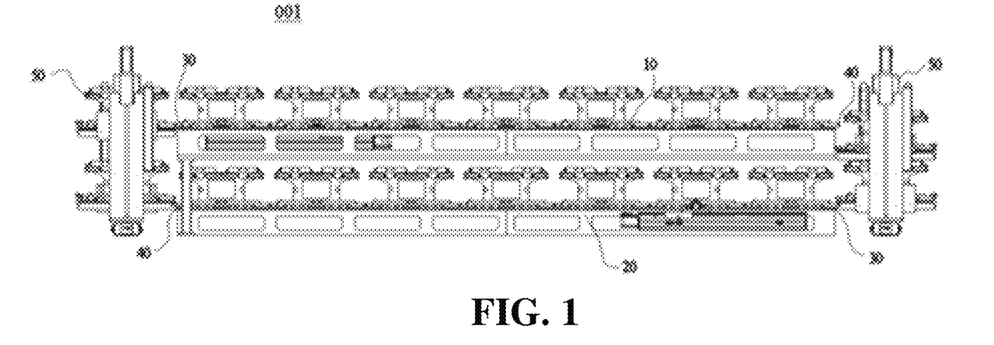
FIG. 1 is a schematic structural diagram of a circulating conveyor in an embodiment of the present application.
Figure 2:
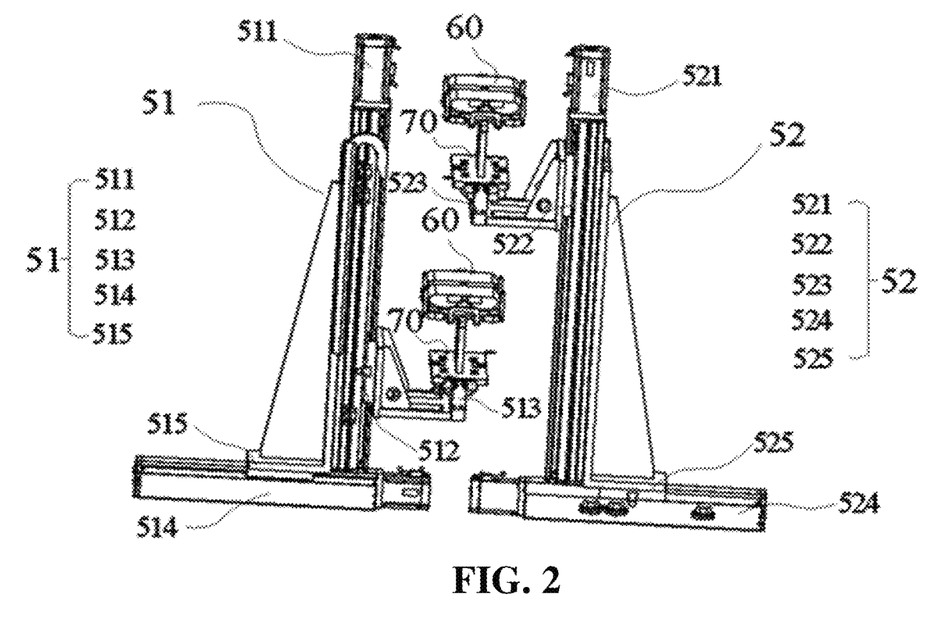
FIG. 2 is a structural diagram of a circulating adapter mechanism in an embodiment of the present application.

Referring to FIG. 1, the present application provides a circulating conveyor 001, comprising: a first conveying line 10 and a second conveying line 20, wherein both the first conveying line 10 and the second conveying line 20 have a loading position 40 and an unloading position 30 at the two ends, clamps 60 are circularly conveyed between the first conveying line 10 and the second conveying line 20 in a clockwise or counterclockwise direction; and a circulating adapter mechanism 50. Referring to FIG. 2, the circulating adapter mechanism 50 comprises a first circulating adapter mechanism 51 and a second circulating adapter mechanism 52 arranged in pairs at both the loading position 40 and the unloading position 30, wherein the loading position 40, the unloading position 30, the first circulating adapter mechanism 51 and the second circulating adapter mechanism 52 are used to convey the clamps 60 between the first conveying line 10 and the second conveying line 20.

The present application does not limit the relative positional relationship between the first conveying line 10 and the second conveying line 20, as long as the output direction of the first conveying line 10 corresponds to the input direction 20 of the second conveying line. Exemplarily, along the moving direction of the conveying lines, the initial moving position of the conveying lines may be the loading position 40, and the final moving position of the conveying lines may be the unloading position 30.

Exemplarily, taking the first conveying line 10 being above the second conveying line 20 and the clamp 60 being conveyed clockwise between the two as an example, the loading position 40 of the first conveying line 10 and the unloading position 30 of the second conveying line 20 are on the same side, and the unloading position 30 of the first conveying line 10 and the loading position 40 of the second conveying line 20 are on the same side.

Based on this, as an example, the present application comprises two circulating adapter mechanisms 50, namely, a first circulating adapter mechanism 51 and a second circulating adapter mechanism 52, and the two circulating adapter mechanisms 50 can be located at the loading position 40 of the first conveying line 10 (the unloading position 30 of the second conveying line 20) and the unloading position 30 of the first conveying line 10 (the loading position 40 of the second conveying line 20) at the same time. That is, when the first circulating adapter mechanism 51 transfers the clamp 60 from the unloading position 30 of the second conveying line 20 to the loading position 40 of the first conveying line 10, the second circulating adapter mechanism 52 can receive the clamp 60 to be transferred at the unloading position 30 of the second conveying line 20, or the second circulating adapter mechanism 52 is at a certain position between the unloading position 30 of the second conveying line 20 and the loading position 40 of the first conveying line 10, and has a tendency to move toward the loading position 40 of the first conveying line 10.

Alternatively, when the first circulating adapter mechanism 51 transfers the clamp 60 from the unloading position 30 of the first conveying line 10 to the loading position 40 of the second conveying line 20, the second circulating adapter mechanism 52 can be on the unloading position 30 of the first conveying line 10 to receive the clamp 60 to be transferred, or the second circulating adapter mechanism 52 is at a certain position between the unloading position 30 of the first conveying line 10 and the loading position 40 of the second conveying line 20, and has a tendency to move toward the loading position 40 of the second conveying line 20. Under the joint action of the first circulating adapter mechanism 51 and the second circulating adapter mechanism 52, it can realize the lifting and lowering of clamps 60 without interfering with each other, synchronously and efficiently conveying clamps 60 in the up and down circulating lines, which improves the production efficiency of the production line.

Specifically, further referring to FIG. 2, the first circulating adapter mechanism 51 comprises a first connecting element 513 and a first driving assembly for driving the first connecting element 513 to move up and down circularly in the vertical direction; the second circulating adapter mechanism 52 comprises a second connecting element 523 and a second driving assembly for driving the second connecting element 523 to move up and down circularly in the vertical direction; the first conveying line 10 comprises a first edge position, and the first connecting element 513 is horizontally aligned with the first conveying line 10 at the first edge position, so that the clamp 60 on the first conveying line 10 is driven by power to move to the first connecting element 513; the second conveying line 20 comprises a second edge position, and the second connecting element 523 is horizontally aligned with the second conveying line 20 at the second edge position, so that the clamp 60 on the second conveying line 20 is driven by power to move to the second connecting element 523.

Exemplarily, the first edge position on the first conveying line 10 in the present application is generally the edge position on the side where the loading position 40 or the unloading position 30 is located in the conveying path of the clamp 60, and correspondingly, the second edge position on the second conveying line 20 in the present application is generally also the edge position on the side where the loading position 40 or the unloading position 30 is located in the conveying path of the clamp 60.

Exemplarily, when both the first circulating adapter mechanism 51 and the second circulating adapter mechanism 52 are at the unloading position 30 of the first conveying line 10, the first connecting element 513 is horizontally aligned with the first edge position, and driven by power, the clamp 60 on the first conveying line 10 can continue to move forward along the conveying direction of the first conveying line 10 and then move to the first connecting element 513; since the first circulating adapter mechanism 51 can move up and down circularly in the vertical direction under the action of the first driving assembly, when the first driving assembly drives the first connecting element 513 with the clamp 60 to move to the loading position 40 of the second conveying line 20, the first connecting element 513 is driven by power to drive the clamp 60 on it and put it on the second conveying line 20; and as the second driving assembly drives the second conveying line 20 for conveying, the clamp 60 on the first connecting element 513 moves together to the second conveying line 20, and then is conveyed on the second conveying line 20.

As above, the process between the first circulating adapter mechanism 51 and the second circulating adapter mechanism 52 can be as above, or, according to production requirements, the conveying time gas between the two can also be set through the driving assemblies. This aims to realize high-speed and stable linear motion on the circulating lines.

The present application does not specifically limit the first driving assembly and the second driving assembly, as long as the circulating of the driving force in the vertical direction can be realized. Exemplarily, both the first driving assembly and the second driving assembly can be telescopic cylinders, and the stretching speed and time interval of the two telescopic cylinders can be set according to needs, so that the two telescopic cylinders respectively drive the two connecting elements to move up and down alternately between the two conveying lines to achieve all the aforementioned effects, which will not be described in detail here.

Exemplarily, the present application does not limit the structure, shape, size, and connection mode between the first driving assembly and the first connecting element 513, as long as the first connecting element 513 can follow the driving force of the first driving assembly to move circularly between the two conveying lines in the vertical direction, and as long as the first connecting element 513 can receive the corresponding clamp 60.

Figure 4:
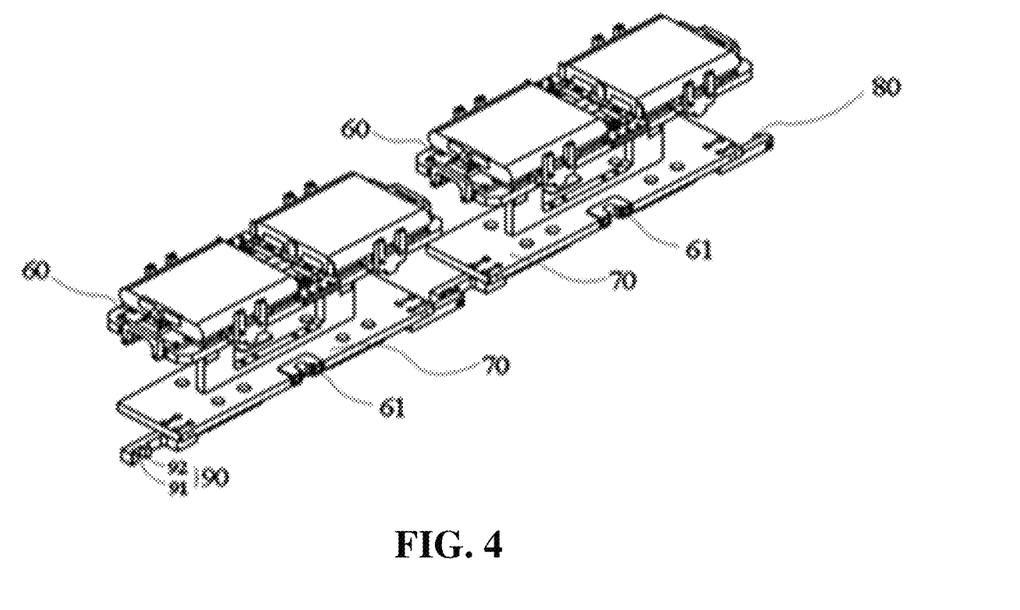
FIG. 4 is a schematic structural diagram of a clamp fixed plate and a first clamp in an embodiment of the present application.
Figure 5:
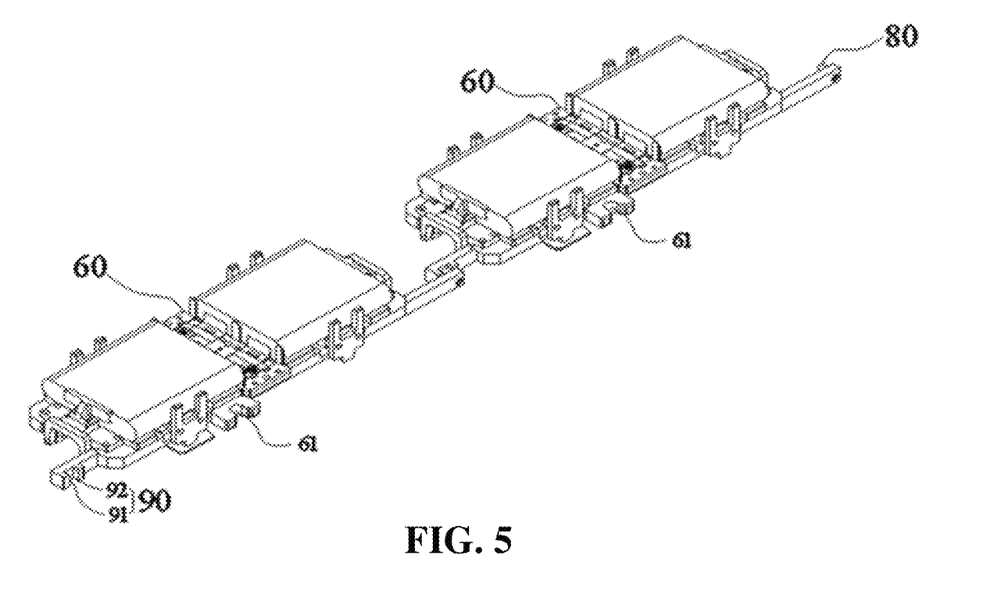
FIG. 5 is a schematic diagram of the connection structure between two clamps having an accommodating portion, a fixing portion and a snap-fit portion in an embodiment of the present application.

Specifically, referring to FIG. 4 or FIG. 5, both the first conveying line 10 and the second conveying line 20 are provided with a plurality of clamps 60 sequentially and detachably connected along the first direction; wherein the first direction is the length direction of the conveying lines.

Exemplarily, the first conveying line 10 of the present application is provided with a plurality of clamps 60 sequentially and detachably connected along its length direction, and adjacent clamps 60 are detachably connected with each other, so that the clamps 60 can realize quick disengagement and quick connection at the loading position 40 and unloading position 30 along the conveying direction of the conveying lines, and the space on the conveying lines can be fully utilized. Exemplarily, the present application does not limit the outer contour structure and size of the clamp 60, as long as it can adapt to the size of the conveying lines. Exemplarily, the detachable connection between the clamps 60 may be a plug-in or snap-fit connection. The present application does not limit the specific structure of the plug-in or snap-fit, as long as the plug-in or snap-fit connection of two adjacent clamps 60 along the length direction of the conveying line can be realized.

Specifically, referring to FIG. 4 or FIG. 5, the clamp 60 is provided with a snap-fit portion 80 and a fixing portion 90 at the two ends in the first direction respectively, and the snap-fit portion 80 of an adjacent clamp 60 can engage with the fixing portion 90. The clamps 60 of the present application are provided with snap-fit portions 80 and fixing portions 90 matched with other on the two sides along the length direction of the conveying lines. The present application does not limit the structure and size of the snap-fit portion 80 and the fixing portion 90, as long as the snap-fit portion 80 and the fixing portion 90 can be matched with each other to realize engagement and disengagement at the loading position 40 and the unloading position 30.

Specifically, the snap-fit portion 80 is configured as a rolling structure, and the fixing portion 90 is configured as a groove structure, the groove structure comprises a first side and a second side opposite to the first side in the first direction, and the rolling structure engages with the groove structure between the first side and the second side.

Exemplarily, in the present application, the snap-fit portion 80 is configured as a rolling structure, the fixing portion 90 is configured as a groove structure, and the rolling structure can realize engagement in the space between the first side and the second side of the groove structure. Because the rolling structure has the characteristics of rolling or sliding in the groove, that is, with the movement of the conveying lines, the rolling structure of the clamp 60 that is driven to the loading position 40 or the unloading position 30 can disengage from the groove structure to further realize the reception of the clamp 60 by the first connecting element 513 or the second connecting element 523.

Exemplarily, the rolling structure of the present application may be a rolling bearing. Alternatively, the rolling structure may also be a roller structure with a function equivalent to the rolling bearing. Exemplarily, both the snap-fit portion 80 and the fixing portion 90 of the present application protrude from the outer edge of the clamp 60.

Specifically, the snap-fit portion 80 and the fixing portion 90 can engage at a position protruding from the edge of the clamp 60 by a first distance. The present application does not limit the first distance, which can be set according to actual production line requirements. Among others, the engagement between the two is used to limit the degree of freedom between the two along the first direction. The clamp 60 is arranged on the conveying lines, and the conveying lines can be set to drive along their length direction. Therefore, as long as two clamps 60 are located at the same height on the conveying line at the same time, the snap-fit portion 80 and the fixing portion 90 engaging with each other will not disengage from each other. After the clamp 60 at the edge of the unloading position 30 is received by the first connecting element 513 or the second connecting element 523, along with the vertical movement of the first driving assembly or the second driving assembly, the snap-fit portion 80 or the fixing portion 90 of the clamp 60 at the edge of the unloading position 30 and the fixing portion 90 or the snap-fit portion 80 of the clamp 60 at the edge of the unloading position 30 change in displacement in the vertical direction, thereby realizing the disengagement between the two.

Correspondingly, engagement with the clamp 60 located at the edge can be realized at the loading position 40, which will not be described in detail here. Exemplarily, each of the clamps 60 of the present application comprises a first joint portion and a second joint portion extending along the two sides of the conveying line in the length direction, and both the first joint portion and the second joint portion can be configured as a strip structure.

Exemplarily, along the width direction of the conveying lines, rolling bearings are mounted and protrude from the side of the strip structure of the first joint portion, and the axis of the rolling bearing is arranged parallel to the width direction of the conveying lines; correspondingly, along the width direction of the conveying lines, two boss structures arranged at intervals protrude from the side of the strip structure of the second joint portion. The two boss structures each have a first side and a second side opposite to each other, a groove structure is formed between the first side and the second sides, and the groove structure is arranged through the height direction of the conveying lines, so that the rolling structure can disengage from the groove structure or it facilitates the engagement of the rolling structure and the groove structure; and the groove structure is set as being open in the direction for placing the rolling structure in the width direction of the conveying lines; and the groove structure comprises a bottom extending along the height direction of the conveying lines and located between the first side and the second side.

Exemplarily, a groove structure for accommodating the rolling structure is formed between the first joint portion and the second joint portion. The structure and structural features of the groove structure are as above, and will not be described in detail here. By applying the groove structure and the rolling structure together, power is transmitted between the groove structure and the rolling structure, and also they can position the clamps 60 with each other, which eliminates the cumbersome structure of repeated positioning of each clamp 60 on the circulating line. Thus, the structure is simpler and more efficient to run.

Specifically, further referring to FIG. 2, the first driving assembly comprises a first cylinder 511 and a first movable block 512 fixedly connected to the piston rod of the first cylinder 511, the first movable block 512 is fixedly connected to the first connecting element 513, and the first cylinder 511 drives the first connecting element 513 to move circularly in the vertical direction through the first movable block 512; the second driving assembly comprises a second cylinder 521 and a second movable block 522 fixedly connected to the piston rod of the second cylinder 521, the second movable block 522 is fixedly connected to the second connecting element 523, and the second cylinder 521 drives the second connecting element 523 to move circularly in the vertical direction through the second movable block 522.

Exemplarily, the first cylinder 511 in the present application may be a first telescopic cylinder, the first telescopic cylinder comprises a first piston rod, the first piston rod is fixedly connected to the first movable block 512, and the first piston rod reciprocates in the vertical direction, during which the first piston rod can drive the first movable block 512 and the first connecting element 513 fixedly connected to the first movable block 512 to reciprocate in the vertical direction. The present application does not limit the connection structure and size between any two, as long as it can ensure that the first connecting element 513 is always in a horizontal state to receive the clamp 60. The present application does not limit the structure, shape and size of the first movable block 512, and the present application does not limit the stroke of the first cylinder 511, as long as it can enables connection at the edge position of the first conveying line 10 and the second conveying line 20 and set the time when the clamp 60 is conveyed to the first connecting element 513 or the second connecting element 523.

Exemplarily, except the side of the first connecting element 513 for directly receiving the clamp 60, any other side can be fixedly connected to the first movable block 512, and the fixed connection can be a detachable fixed connection or a non-detachable fixed connection. The present application does not limit the way of fixed connection, and the two may be integrally formed, or the two may be fixedly connected through hole-shaft, fixedly connected through pin-hole, and the like.

Exemplarily, the side of the first connecting element 513 of the present application for receiving the clamp 60 is always set horizontally. The above limitations for the first cylinder 511, the first movable block 512 and the first connecting element 513 are also applicable to the second cylinder 521, the second movable block 522 and the second connecting element 523, which will not be described in detail here.

Additionally, in the present application, the first connecting element 513 can be a single plate structure, or it can be a multi-structural assembly, which is set according to actual needs. When the first connecting element 513 is a multi-structural assembly, the structures are connected with each other to form a stable supporting structure for supporting the clamp 60. Exemplarily, the present application does not limit the specific structure of the first connecting element 513. In the present application, the second connecting element 523 can be a single plate structure, or it can be a multi-structural assembly, which is set according to actual needs. When the second connecting element 523 is a multi-structural assembly, the structures are connected with each other to form a stable supporting structure for supporting the clamp 60. Exemplarily, the present application does not limit the specific structure of the second connecting element 523.

Specifically, further referring to FIG. 2, the first driving assembly comprises a first horizontal driving module, the first horizontal driving module comprises a first servo motor 514 and a third movable block 515 sliding on the guide rail of the first servo motor 514 along a second direction, and the first cylinder 511 is fixedly connected to the third movable block 515; the second driving assembly comprises a second horizontal driving module, the second horizontal driving module comprises a second servo motor 524 and a fourth movable block 525 sliding on the guide rail of the second servo motor 524 along the second direction, and the second cylinder 521 is fixedly connected to the fourth movable block 525; wherein, the second direction is the width direction of the conveying lines (the first cylinder 511 and the second cylinder 521).

Exemplarily, both the first horizontal driving module and the second horizontal driving module may be telescopic cylinders or servo driving motors. The two can respectively drive the first cylinder 511 and the second cylinder 521 through the third movable block 515 and the fourth movable block 525 to adjust the position in the horizontal direction. Specifically, the two can respectively drive the position of the first connecting element 513 and the second connecting element 523 in the width direction of the conveying lines, so that it is convenient to adjust the first connecting element 513 and the second connecting element 523 to enable them to connect to the edge of the first conveying line 10 and the edge of the second conveying line 20. All the above effects are further realized, and the operation accuracy of the equipment is further improved.

Figure 3:
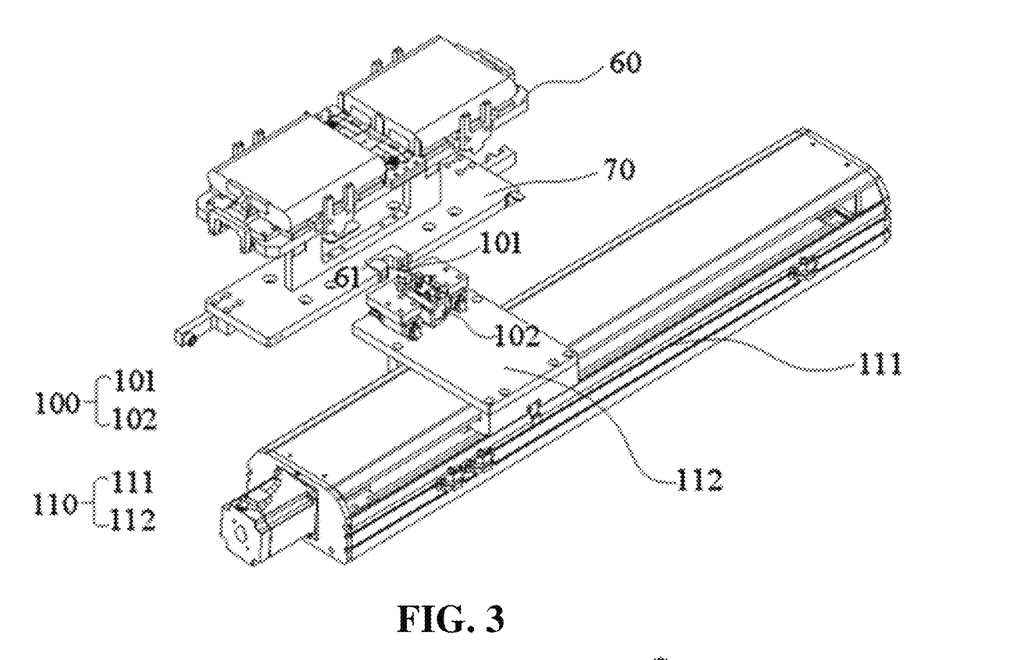
FIG. 3 is a schematic diagram of the structure between a third driving module, a positioning assembly and an accommodating portion in an embodiment of the present application.

Specifically, referring to FIG. 3, the circulating conveyor 001 further comprises a third horizontal driving module, the third horizontal driving module comprises a positioning assembly 100 and a third driving assembly 110 for driving the positioning assembly 100 to move in the first direction; the side of the clamp 60 is provided with an accommodating portion 61, the positioning assembly 100 can be locked and matched with the accommodating portion 61, and the clamp 60 is conveyed in the first direction along with the positioning assembly 100. Exemplarily, the third driving assembly 110 may be a servo driving motor, and the present application does not limit the way of connection between the positioning assembly 100 and the third driving assembly 110, as long as the third driving assembly 110 can drive the positioning assembly 100 to move along the length direction of the conveying lines. The present application does not specifically limit the structure of the positioning assembly 100, as long as the positioning assembly 100 and the accommodating portion 61 can be matched and locked together, and the movement of the positioning assembly 100 can drive the movement of the accommodating portion 61 and the clamp 60 with the accommodating portion 61. As mentioned above, the present application has limited the moving direction of the overall clamps 60, which will not be described in detail here. Through the servo driving motor, the driving force of the lateral movement of the clamp 60 is realized. Using the servo driving motor, precise movement points and real-time reflection of torque change are achieved.

Specifically, referring to FIG. 3, the positioning assembly 100 comprises a positioning pin 101 and a positioning cylinder 102 for driving the positioning pin 101 to move along a first direction, and the positioning pin 101 is matched with the accommodating portion 61 for positioning. All the above-mentioned effects can be realized, and details are not described in detail here. Exemplarily, the push rod of the positioning cylinder 102 is connected to the positioning pin 101 through a fixed plate, and two guide rail slider assemblies are respectively arranged on the two sides of the bottom of the fixed plate, and the two sides of the bottom of the fixed plate are respectively fixedly connected to the two sliders of the above two guide rail slider assemblies, wherein the guiding direction of the guide rail of the two guide rail slider assemblies is the same as the width direction of the conveying lines, so as to further improve the precision of the direction in which the positioning cylinder 102 drives the positioning pin 101 to move along the width direction of the conveying lines, thereby realizing the precise locking and positioning of the positioning pin 101 and the accommodating portion 61.

Specifically, referring to FIG. 3, the third driving assembly 110 comprises a third servo motor 111 and a fifth movable block 112 sliding along the length direction of the third servo motor 111, and the positioning cylinder 102 is fixedly arranged on the fifth movable block 112 (the third movable block 515, the positioning cylinder 102, the third movable block 515). Exemplarily, the third servo motor 111 may also be the third cylinder. Exemplarily, the third cylinder may be a telescopic cylinder comprising a piston rod, and the piston rod of the third cylinder moves along the width direction of the conveying lines. As above, the positioning cylinder 102 is fixed on the fifth movable block and can move along with the fifth movable block. When the conveying lines are stopped, the positioning cylinder 102 is in a contracted state, and the positioning pin 101 is spaced apart from the accommodating portion 61 with a safety distance between them. When the conveying lines need to be driven, the positioning cylinder 102 is in an extended state to drive the positioning pin 101 into the accommodating portion 61, and under the action of the third driving assembly 110, the positioning cylinder 102, the positioning pin 101, the accommodating portion 61 and the clamp 60 are driven to move continuously.

Optionally, referring to FIG. 5, the clamp 60 comprises a clamp 60 and a clamp fixed plate 70 for supporting the clamp 60, the clamp fixed plate 70 is located below the clamp 60, and the accommodating portion 61, the fixing portion 90 and the snap-fit portion 80 are all arranged on the clamp fixed plate 70. Exemplarily, the conveying lines of the present application can also comprise a clamp fixed plate 70, and the clamps 60 are placed on the clamp fixed plate 70. The conveying lines comprise a fixing block and a sliding rail for moving along the width direction of the fixing block, and the clamp fixed plate 70 is fixed on the sliding rail. The aforementioned limitations on the features of the rolling structure, the groove structure and the accommodating portion 61 on the clamp 60 can also be applied to the clamp fixed plate 70. The aforementioned detachable connection between the clamps 60 can be understood as the detachable connection between the clamp fixed plates 70, and the corresponding positioning or connection mode between the clamps 60 is also applicable to the positioning or connection mode between the clamp fixed plates 70, which will not be described in detail here. Furthermore, convenient grasping of the clamps 60 is realized.

The aforementioned technical features of the above embodiments can be combined arbitrarily. In order to make the description concise, not all possible combinations of the technical features in the above embodiments are described. However, all the combinations of the technical features should be considered as falling within the scope described in the specification provided that they do not conflict with each other.

The above embodiments only describe several implementations of the present application, and the description thereof is specific and detailed, but cannot therefore be understood as a limitation on the patent scope of the present application. It should be noted that those of ordinary skill in the art may further make variations and improvements without departing from the concept of the present application, all of which fall within the protection scope of the present application. Therefore, the patent protection scope of the present application should be subject to the appended claims.

What is claimed is:

1. A circulating conveyor, comprising:
a first conveying line and a second conveying line, wherein the first conveying line has a loading position at one end and an unloading position at the other end; and the second conveying line has a loading position at one end and an unloading position at the other end, and clamps are circularly conveyed between the first conveying line and the second conveying line in a clockwise or counterclockwise direction; and
a circulating adapter comprising a first circulating adapter and a second circulating adapter arranged in pairs at both the loading position and the unloading position, wherein the first circulating adapter and the second circulating adapter are used to convey the clamps between the first conveying line and the second conveying line,
wherein the first circulating adapter comprises a first connecting structure and a first driving assembly for driving the first connecting structure to move up and down circularly in the vertical direction; the second circulating adapter comprises a second connecting structure and a second driving assembly for driving the second connecting structure to move up and down circularly in the vertical direction;
the first conveying line comprises a first edge position, and the first connecting structure is horizontally aligned with the first conveying line at the first edge position, so that the clamp on the first conveying line is driven by power to move to the first connecting structure;
the second conveying line comprises a second edge position, and the second connecting structure is horizontally aligned with the second conveying line at the second edge position, so that the clamp on the second conveying line is driven by power to move to the second connecting structure;
the first driving assembly comprises a first horizontal driver, the first horizontal driver comprises a first servo motor and a third movable block sliding on a guide rail of the first servo motor along a second direction, and the first cylinder is relatively fixedly connected to the third movable block;
the second driving assembly comprises a second horizontal driver, the second horizontal driver comprises a second servo motor and a fourth movable block sliding along the second direction, and the second cylinder is fixedly connected to the fourth movable block; and
the second direction is the width direction of each conveying line.

2. The circulating conveyor according to claim 1, wherein both the first conveying line and the second conveying line are provided with a plurality of clamps sequentially and detachably connected along a first direction; wherein, the first direction is the length direction of each conveying line.

3. The circulating conveyor according to claim 2, wherein the clamp is provided with a snap-fit structure and a fixing structure respectively at the two ends in the first direction, and the snap-fit structure of the adjacent clamp can engage with the fixing structure.

4. The circulating conveyor according to claim 3, wherein the snap-fit structure is a rolling structure, the fixing structure is a groove structure, the groove structure comprises a first side and a second side opposite to the first side in the first direction, and the rolling structure engages with the groove structure between the first side and the second side.

5. The circulating conveyor according to claim 2, wherein the first driving assembly comprises a first cylinder and a first movable block fixedly connected to a piston rod of the first cylinder, the first movable block is fixedly connected to the first connecting structure, and the first cylinder drives the first connecting structure to move circularly in the vertical direction through the first movable block; and
the second driving assembly comprises a second cylinder and a second movable block fixedly connected to a piston rod of the second cylinder, the second movable block is fixedly connected to the second connecting structure, and the second cylinder drives the second connecting structure to move circularly in the vertical direction through the second movable block.

6. The circulating conveyor according to claim 4, wherein the circulating conveyor further comprises a third horizontal driver, and the third horizontal driver comprises a positioning assembly and a third driving assembly for driving the positioning assembly to move in the first direction; and
an accommodating structure is provided on a side of the clamp, the positioning assembly is capable of locking and matching with the accommodating structure, and the accommodating structure conveys the clamp in the first direction along with the positioning assembly.

7. The circulating conveyor according to claim 6, wherein the positioning assembly comprises a positioning pin and a positioning cylinder for driving the positioning pin to move along the first direction, and the positioning pin is matched with the accommodating structure for positioning.

8. The circulating conveyor according to claim 7, wherein the third driving assembly comprises a third servo motor and a fifth movable block sliding along the length direction of the third servo motor, and the positioning cylinder is fixedly disposed on the fifth movable block.

9. The circulating conveyor according to claim 7, wherein the clamp comprises a first clamp and a clamp fixed plate for supporting the first clamp, the clamp fixed plate is located below the first clamp, and the accommodating structure, the fixing structure and the snap-fit structure are all disposed on the clamp fixed plate.

10. A circulating conveyor, comprising:
a first conveying line and a second conveying line, wherein the first conveying line has a loading position at one end and an unloading position at the other end; and the second conveying line has a loading position at one end and an unloading position at the other end, and clamps are circularly conveyed between the first conveying line and the second conveying line in a clockwise or counterclockwise direction; and
a circulating adapter comprising a first circulating adapter and a second circulating adapter arranged in pairs at both the loading position and the unloading position, wherein the first circulating adapter and the second circulating adapter are used to convey the clamps between the first conveying line and the second conveying line, wherein the first circulating adapter comprises a first connecting structure and a first driving assembly for driving the first connecting structure to move up and down circularly in the vertical direction; the second circulating adapter comprises a second connecting structure and a second driving assembly for driving the second connecting structure to move up and down circularly in the vertical direction;

the first conveying line comprises a first edge position, and the first connecting structure is horizontally aligned with the first conveying line at the first edge position, so that the clamp on the first conveying line is driven by power to move to the first connecting structure;

the second conveying line comprises a second edge position, and the second connecting structure is horizontally aligned with the second conveying line at the second edge position, so that the clamp on the second conveying line is driven by power to move to the second connecting structure;

the first driving assembly comprises a first cylinder and a first movable block fixedly connected to a piston rod of the first cylinder, the first movable block is fixedly connected to the first connecting structure, and the first cylinder drives the first connecting structure to move circularly in the vertical direction through the first movable block; and the second driving assembly comprises a second cylinder and a second movable block fixedly connected to a piston rod of the second cylinder, the second movable block is fixedly connected to the second connecting structure, and the second cylinder drives the second connecting structure to move circularly in the vertical direction through the second movable block.

11. The circulating conveyor according to claim 10, wherein both the first conveying line and the second conveying line are provided with a plurality of clamps sequentially and detachably connected along a first direction;

wherein, the first direction is the length direction of each conveying line.

12. The circulating conveyor according to claim 11, wherein the clamp is provided with a snap-fit structure and a fixing structure respectively at the two ends in the first direction, and the snap-fit structure of the adjacent clamp can engage with the fixing structure.

13. The circulating conveyor according to claim 12, wherein the snap-fit structure is a rolling structure, the fixing structure is a groove structure, the groove structure comprises a first side and a second side opposite to the first side in the first direction, and the rolling structure engages with the groove structure between the first side and the second side.

14. The circulating conveyor according to claim 10, wherein the first driving assembly comprises a first horizontal driver, the first horizontal driver comprises a first servo motor and a third movable block sliding on a guide rail of the first servo motor along a second direction, and the first cylinder is relatively fixedly connected to the third movable block; and the second driving assembly comprises a second horizontal driver, the second horizontal driver comprises a second servo motor and a fourth movable block sliding along the second direction, and the second cylinder is fixedly connected to the fourth movable block;

wherein, the second direction is the width direction of each conveying line.

15. The circulating conveyor according to claim 13, wherein the circulating conveyor further comprises a third horizontal driver, and the third horizontal driver comprises a positioning assembly and a third driving assembly for driving the positioning assembly to move in the first direction; and an accommodating structure is provided on a side of the clamp, the positioning assembly is capable of locking and matching with the accommodating structure, and the accommodating structure conveys the clamp in the first direction along with the positioning assembly.

16. The circulating conveyor according to claim 15, wherein the positioning assembly comprises a positioning pin and a positioning cylinder for driving the positioning pin to move along the first direction, and the positioning pin is matched with the accommodating structure for positioning.

17. The circulating conveyor according to claim 16, wherein the third driving assembly comprises a third servo motor and a fifth movable block sliding along the length direction of the third servo motor, and the positioning cylinder is fixedly disposed on the fifth movable block.

18. The circulating conveyor according to claim 16, wherein the clamp comprises a first clamp and a clamp fixed plate for supporting the first clamp, the clamp fixed plate is located below the first clamp, and the accommodating structure, the fixing structure and the snap-fit structure are all disposed on the clamp fixed plate.

* * * * *